Patented July 10, 1928.

1,676,470

UNITED STATES PATENT OFFICE.

ROGER ADAMS, OF URBANA, AND ERNEST H. VOLWILER, OF CHICAGO, ILLINOIS, ASSIGNORS TO THE ABBOTT LABORATORIES, OF CHICAGO, ILLINOIS, A CORPORATION OF ILLINOIS.

PRODUCTION OF ESTERS OF AROMATIC ACIDS.

No Drawing. Application filed March 9, 1922, Serial No. 542,462, and in Great Britain September 27, 1921.

Our invention relates to the production of gamma-dialkylamino-n-propyl alcohol esters of aromatic acids which possess the general formula

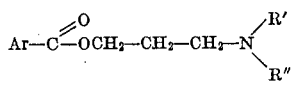

In this formula R' and R'' are used to represent alkyl radicals which may be either alike or different but one of which is in any case larger than an ethyl group, while Ar is used to represent an aryl group, that is:—A phenyl or a substituted phenyl group.

A general statement of the process of producing these esters is, as follows:—

A gamma halogen propyl benzoate or a similar compound with a substituted benzoyl radical is added to an excess of dialkylamine and heated for several hours. The resulting product is made alkaline, the excess amine steam distilled out and the gamma-dialkylamino propyl ester of the aromatic acid extracted with an organic solvent, such as ether. The ether is then removed, leaving the free base. If an amino benzoic acid derivative is desired, a nitro gamma halogen propyl benzoate is used at the beginning, and the base resulting from the treatment with the dialkylamine is reduced with tin or iron and hydrochloric acid, electrolytically, or by some other method. These compounds, either in the form of their bases or salts, possess valuable local anesthetic properties.

A specific compound belonging to the general series as above defined is the gamma-di-n-butyl amino propyl ester of p-amino benzoic acid having the formula

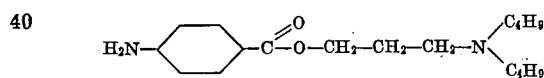

It can be prepared by the following specific form of the general process just described:

Thus 40 grams p-nitro-gamma-brompropyl benzoate and 40 grams dibutyl amine are heated together at 60° C., for four hours. The excess dibutyl amine is removed by washing the product with water and then steam distilling the residue. The material remaining in the flask is taken up in benzene and treated with aqueous hydrochloric acid. Part of the p-nitro benzoyl gamma di-n-butyl amino propanol hydrochloride thus formed goes into the water layer, while most of it separates as a heavy oily layer. This, together with the water layer, is separated from the benzene layer, made alkaline, and the resulting base taken up in benzene. Upon removal of the solvent, the desired nitro base is obtained.

The nitro compound thus obtained is reduced by warming to about 60° with an excess of iron filings and a small amount of hydrochloric acid for four hours. The material is then allowed to cool, neutralized with dilute sodium hydroxide solution, and extracted with ether. Upon the removal of the ether, the free base, para-aminobenzoyl gamma-di-n-butylamino propanol, remains behind as an oil. It is exactly neutralized with aqueous hydrochloric acid and the resulting solid salt purified by recrystallization from water or a suitable organic solvent. It melts at 151°–152° C. (corr.) after drying at 100° C. Other salts, such as the hydrobromide (M. P. 143°) and the sulphate (M. P. 100°) may be prepared from the free base.

It will be observed that in the method just described, the reduction step of the process is performed subsequent to the condensation. A method in which the condensation is effected subsequent to the reduction will now be described.

As an example of this alternative method 5 grams p-nitro-gamma-brom-propyl benzoate is reduced at 60° for three hours with 15 grams iron filings and a small amount of hydrochloric acid. The mixture is then made alkaline and the amino compound extracted with ether.

After the removal of the ether, the compound is purified by recrystallization from ligroin (B. P. 85–95°); it melts at 81½° (corr.).

The above p-amino-gamma brom propyl benzoate is heated with two molecular weights of dibutyl amine for several hours. The amino compound at first dissolves, and soon the crystalline hydrobromide of dibutyl amine begins to separate. The excess dibutyl amine is removed by vacuum distillation, water added to the residue, and the oil taken up in ether. The dried ether extract is evaporated and the residue exactly neutralized with aqueous hydrochloric acid. Upon recrystallization of the resulting solid from water or a suitable organic solvent, the pure para-amino-benzoyl gamma-di-n-butyl amino propanol hydrochloride is obtained as a white solid, melting at 151-2° (corr.). The corresponding salts of other acids may be prepared in similar manner.

We claim:

1. The process of producing a compound of the general series:

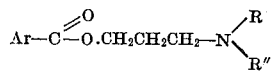

in which R' and R'' represent alkyl radicals, one of which is larger than an ethyl group, and in which Ar represents an aryl group, which consists in condensing the gamma-halogen-n-propyl alcohol ester of a benzoic acid, with a di-alkyl amine in which one of the alkyl groups is greater than ethyl.

2. The process of producing an amino benzoyl ester of gamma-di-alkyl-amino-n-propyl alcohol where one of the alkyl groups is greater than ethyl, which consists in first condensing a gamma-halogen-n-propyl nitro-benzoate with a di-alkyl amine in which one of the alkyl groups is greater than ethyl, and then reducing to the corresponding amino compound.

3. The process of producing gamma-di-n-butyl-amino-n-propyl ester of para-amino benzoic acid which consists first in condensing p-nitro-gamma-halogen-n-propyl-benzoate with dibutyl amine, and subsequently reducing to the corresponding amino compound.

4. In a process of producing an amino benzoyl ester of gamma-di-alkyl-amino-propyl alcohol where one of the alkyl groups is greater than ethyl, the step which consists in condensing a gamma-halogen-n-propyl nitro-benzoate with a secondary amine containing an alkyl group greater than ethyl.

5. The process of producing an amino bezoyl ester of gamma-di-alkyl-amino-propyl alcohol where one of the alkyl groups is greater than ethyl, which consists in condensing a gamma-halogen-n-propyl nitro-benzoate with a secondary amine, in which an alkyl group is greater than ethyl, and reducing to the amino compound.

6. The process of producing gamma-di-n-butyl-amino-n-propyl ester of para-amino benzoic acid which consists first in condensing p-nitro-gamma-halogen-n-propyl-benzoate with dibutyl amine, and subsequently reducing to an amino compound.

7. A process as set forth in claim 1 wherein the condensation is effected by heating for several hours.

8. A process as set forth in claim 4 in which the condensation is effected by heating at a temperature below the boiling point of water.

9. A process as set forth in claim 5 in which the condensation is effected by heating at approximately 60° C.

10. A process as set forth in claim 1 in which the condensation is effected by heating under normal atmospheric pressure.

ROGER ADAMS.
ERNEST H. VOLWILER.